R. C. GREER.
STRAINER FOR FILTERS.
APPLICATION FILED APR. 5, 1907.
908,090.
Patented Dec. 29, 1908.
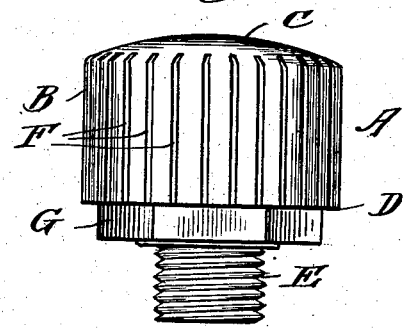
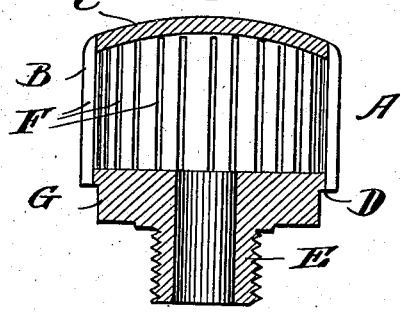
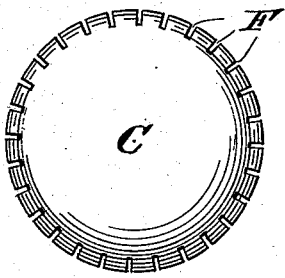
Witnesses,
Inventor,
Roland C. Greer
By Offield, Towle & Linthicum
Attys.

UNITED STATES PATENT OFFICE.

ROLAND C. GREER, OF CHICAGO, ILLINOIS.

STRAINER FOR FILTERS.

No. 908,090.　　　Specification of Letters Patent.　　　Patented Dec. 29, 1908.

Application filed April 5, 1907. Serial No. 366,598.

*To all whom it may concern:*

Be it known that I, ROLAND C. GREER, a citizen of the United States, residing at Chicago, in the county of Cook and State of Illinois, have invented certain new and useful Improvements in Strainers for Filters, of which the following is a specification.

My invention consists of a strainer for a filter, the same being constructed whereby it is adapted to endure the great weight or strain to which it is subjected by the filter bed superimposed thereon, while also providing an extensive straining or trapping capacity, as will be hereinafter more fully described.

Figure 1 represents a side elevation of a strainer embodying my invention. Fig. 2 represents a central vertical section thereof. Fig. 3 represents a top or plan view thereof.

Similar letters of reference indicate corresponding parts in the figures.

Referring to the drawings, A designates the body of the strainer, the same being hollow and composed of the side wall B, the top C, bottom D, attaching neck E and narrow slits or kerfs F in said side wall.

The body is primarily integral, preferably constructed by casting, and the slits or kerfs are formed in the side wall B by any suitable implement.

The neck E is screw-threaded so as to be attached to the proper pipe of a filter, it being seen that the body is strong and durable and not liable to be crushed by the weight of the filter bed superimposed on the top of the same, said top being comparatively solid, and being furthermore curved upwardly or dome-shaped and so possessing increased strength. Furthermore, the slits or kerfs extend the entire length of the side wall B, and provide extensive capacity for straining or trapping purposes, thus effectually preventing the material of the filter bed and foreign substances from entering the body A, and clogging the latter, whereby the filtered water or fluid may readily pass through said side wall and enter the body of the strainer, from whence it is directed by the neck E to a conveying or discharge pipe with which the strainer is connected.

The upper end of the threaded neck E preferably has formed thereon a wrench-hold in the form of an integral nut G, for the application of a wrench in applying the strainer to the filter pipe.

I claim:

1. A strainer of the character described, consisting of a hollow body formed of an imperforate top, vertically slotted sides, and a centrally apertured bottom provided with a threaded boss for attachment to a supply pipe, substantially as described.

2. A strainer of the character described, consisting of a hollow body formed of an imperforate top, vertically slotted sides, and a centrally apertured bottom provided with an integral nut and threaded boss for attachment to a supply pipe, substantially as described.

3. A strainer of the character described, consisting of an integral hollow cylindrical body formed of a dome-shaped imperforate top, vertically slotted sides, and a centrally apertured bottom provided with a nut and a depending threaded boss for attachment to a supply pipe, substantially as described.

ROLAND C. GREER.

Witnesses:
　SAMUEL N. POND,
　FREDERICK C. GOODWIN.